R. M. BRECKENRIDGE.
Stove-Pipe Dampers.
No. 5,239. Reissued Jan. 21, 1873.
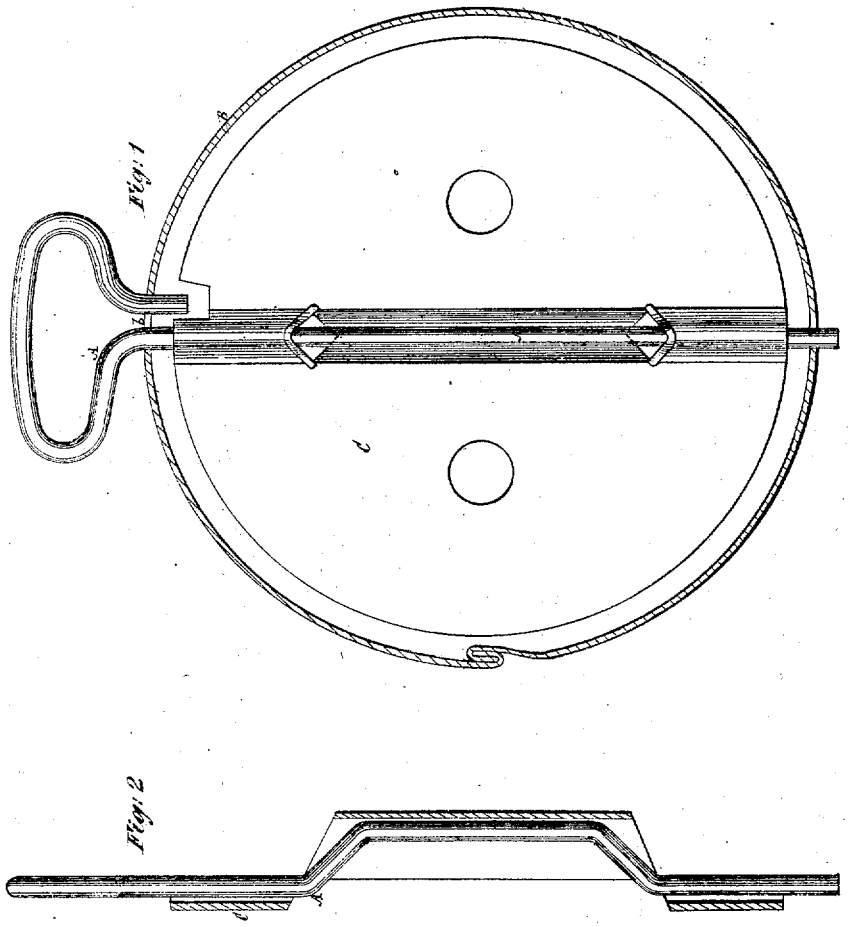
Witnesses:
Fr. C. Haynes
Fred Kueck
R. Mos Breckenridge.
per Brown & Allen
Attorneys
AM. PHOTO-LITHOGRAPHIC CO. N.Y. (OSBORNE'S PROCESS)

UNITED STATES PATENT OFFICE.

R. MOSS BRECKENRIDGE, OF WEST MERIDEN, CONNECTICUT.

IMPROVEMENT IN STOVE-PIPE DAMPERS.

Specification forming part of Letters Patent No. 56,891, dated August 7, 1866; reissue No. 5,239, dated January 21, 1873.

*To all whom it may concern:*

Be it known that I, R. MOSS BRECKENRIDGE, of West Meriden, in the county of New Haven and State of Connecticut, have invented a new and Improved Damper for Stoves, Pipes, &c.; and I do hereby declare that the following is a full, clear, and exact description of the same, reference being had to the accompanying drawing, in which—

Figure 1 is a sectional view of a stove-pipe, showing the damper-plate shut. Fig. 2 is a sectional view of the damper-plate, showing the manner in which the rod by and with which it turns passes through it.

My improvements consist in the manner of attaching to the damper-plate the rod by which it is turned; and also in providing a spring on the side of the damper-plate rod arranged in such a manner as to hold the damper-plate in any situation by the friction of said spring on the side of the aperture in the pipe through which the rod passes.

In the accompanying drawing the spring above referred to is here represented as formed by bending the damper-plate rod A at its outer or handle portion in the form of a ring or open eye, with a free or detached end, and passing said end down into the aperture B, so that it may, by its tendency to spring outward, press against the side of said aperture, and thus hold the damper-plate in position by its friction. My other improvement consists in the manner of joining together the rod A and damper-plate C by bending the rod so as to fit a depression formed in the damper-plate, and so that the rod and plate are held tightly together by means of the elasticity of the rod, the curvatures of which are compressed when forced into the groove or depression. In this way, by a single wire rod and a plate, I obtain a simple and perfectly-adjustable damper at a very small expense.

What is here claimed, and desired to be secured by Letters Patent, is—

1. The rod A combined and arranged with the damper-plate C, substantially as and for the purpose herein set forth.

2. The rod or handle of the damper-plate, constructed or provided with a spring arranged to enter and bear against the edges of the aperture in the pipe through which said rod passes, essentially as specified.

R. M. BRECKENRIDGE.

Witnesses:

FRED HAYNES,
MICHAEL RYAN.